United States Patent
Wu et al.

(10) Patent No.: US 9,963,824 B2
(45) Date of Patent: May 8, 2018

(54) METHODS FOR DEINKING WASTEPAPER BY COMBINED USE OF CUTINASE AND CHEMICAL REAGENTS

(71) Applicants: Jing Wu, Wuxi (CN); Lingqia Su, Wuxi (CN); Ruoyu Hong, Wuxi (CN)

(72) Inventors: Jing Wu, Wuxi (CN); Lingqia Su, Wuxi (CN); Ruoyu Hong, Wuxi (CN)

(73) Assignee: Jiangnan University, Wuxi, JS (CN)

( * ) Notice: Subject to any disclaimer, the term of this patent is extended or adjusted under 35 U.S.C. 154(b) by 165 days.

(21) Appl. No.: 15/051,677

(22) Filed: Feb. 24, 2016

(65) Prior Publication Data
US 2017/0137995 A1    May 18, 2017

(30) Foreign Application Priority Data
Nov. 17, 2015 (CN) .......................... 2015 1 0791033

(51) Int. Cl.
  *D21C 9/02* (2006.01)
  *D21C 5/02* (2006.01)
  *D21C 5/00* (2006.01)

(52) U.S. Cl.
  CPC ............. *D21C 5/027* (2013.01); *D21C 5/005* (2013.01); *Y02W 30/648* (2015.05)

(58) Field of Classification Search
  CPC .......... D21C 5/027; D21C 5/005; D21C 9/02; D21C 9/18
  USPC .......................................................... 162/5
  See application file for complete search history.

(56) References Cited

U.S. PATENT DOCUMENTS

| | | | | |
|---|---|---|---|---|
| 5,807,464 A | * | 9/1998 | Jobbins | D21C 5/005 162/4 |
| 5,817,212 A | * | 10/1998 | Jobbins | D21C 5/027 162/4 |
| 6,426,200 B1 | * | 7/2002 | Yang | D21C 5/025 435/18 |
| 7,282,113 B2 | * | 10/2007 | Elgarhy | D21C 5/005 162/5 |
| 2006/0102299 A1 | * | 5/2006 | Elgarhy | D21C 5/005 162/5 |
| 2014/0050934 A1 | * | 2/2014 | Siegenthaler | B32B 15/08 428/458 |

* cited by examiner

*Primary Examiner* — Mark Halpern
(74) *Attorney, Agent, or Firm* — Lili Chen

(57) ABSTRACT

The present invention provides methods for deinking wastepaper by combined use of cutinase and chemical reagents, which relates to the field of enzyme engineering. The method comprises the following steps: pulp preparation, enzymatic hydrolysis, pulp washing and dewatering, and flotation. The enzyme for enzymatic hydrolysis is cutinase at a concentration of 10-20 U/g absolute dry pulp; and 0.5-4% $Na_2SiO_3$, 0.1-0.8% $MgSO_4$, 0.1-0.8% EDTA, 0.1-4% $H_2O_2$ are used in the chemical treatment. With combined use of enzymatic and chemical treatment, the present invention has solved the problem of the current enzymatic method for deinking that requires large dosage of enzymes and thus high cost. Through proper choice of the kind and the amount of chemical reagents, synergistic effects of the enzymatic and chemical treatment can be achieved, thus increasing the effectiveness of the deinking process. In addition, this method does not require alkaline chemicals, which alleviates the problem of sewage treatment associated with conventional deinking methods.

8 Claims, No Drawings

METHODS FOR DEINKING WASTEPAPER BY COMBINED USE OF CUTINASE AND CHEMICAL REAGENTS

CROSS-REFERENCES AND RELATED APPLICATIONS

This application claims the benefit of priority to Chinese Application No. 201510791033.7, entitled "methods for deinking wastepaper by combined use of cutinase and chemical reagents", filed Nov. 17, 2015, which is herein incorporated by reference in its entirety.

BACKGROUND OF THE INVENTION

Field of the Invention

The present invention relates to the field of enzyme engineering. It particularly relates to methods for deinking wastepaper by combined use of cutinase and chemical reagents.

Description of the Related Art

Secondary fiber, also known as renewable fiber, has been used in paper and paperboard production for many years. With the increasing demand of paper and paperboard over the world, and the rising awareness of environmental conservation, the protection of forest resources has been enhanced in countries around the world, leading to increased proportion of the secondary fibers usage in papermaking industry. Paper recovery and recycling is an effective way to solve the problems such as resource shortage, energy shortage and environmental pollution in the paper industry. It is also an important measure to implement cleaner industrial production and promote sustainable development. According to the survey of China Paper Association, the proportion of the secondary fibers in papermaking materials has been increasing year by year. The pulp consumption of China was 84,610 thousand tons in 2010. The consumption of wastepaper pulp was 53,050 thousand tons, which accounted for 63% of the total consumption, with a growth of 6.16% over the previous year.

Wastepaper deinking is generally the first process in renewable fiber recycling, which includes both chemical and physical reactions. Deinking reagents are usually used to destroy the adsorption between fibers and printing ink, and the ink particles are removed from fibers under a certain temperature and shear forces. The ink is mainly composed of pigment, connection material, and auxiliary reagents. The connection material is prepared by dissolving a small amount of natural resin, synthetic resin, rubber and other rubber derivatives in drying oil or other solvent. The protective effect of connection material on pigments makes it difficult to fall off from the fiber. Due to the stickiness of connection material, the pigment is difficult to be removed in deinking process, which affects the production of recycling pulp.

The traditional chemical flotation and washing method are still the main methods for wastepaper deinking in China. Washing method is carried out by washing pulp repeatedly with large amounts of water, which separates ink particles from fibers. It removes fillers and the fine fibers in wastepaper, which helps to achieve the purpose of cleaning. The flotation method is employed by attaching ink particles to bubbles so that ink particles can be removed by floating upwards with the bubbles. Conventional chemical methods have many shortcomings, such as requirement of large amount of alkaline substances, causing environmental pollution due to discharged waste water, requirement of large amounts of chemicals for waste water treatment and limited improvement of paper whiteness. Enzymatic deinking technology is the focus of researches in recent years. Many researches showed that it is efficient in improving flotation efficiency, reducing fiber loss, and reducing the amount of chemical usage. However, the current enzymatic method requires large amounts of enzyme, which limits its wide application due to the high cost. There is a need in developing a cost efficient enzymatic method for wastepaper deinking. The present invention satisfies this need and provides other benefits as well.

DETAILED DESCRIPTION

The goal of the present invention is to provide a cost efficient method for wastepaper deinking by combining the usage of cutinase and chemical reagents. The present method overcomes the shortcoming of current enzymatic method that requires large amounts of enzyme, which leads to high costs of the method. By choosing the appropriate kind and amount of chemical reagents, the present method is able to achieve synergetic effect for chemical treatment and enzymatic reactions, thus improving the efficiency of wastepaper deinking. In addition, the method avoids the usage of alkaline substances, solving the problem of sewage treatment caused by conventional chemical deinking process.

In one embodiment, the present invention provides a method for wastepaper deinking, comprising the following steps: pulp preparation, enzymatic hydrolysis, chemical treatment, pulp washing and dewatering, and flotation. The enzyme for enzymatic hydrolysis is cutinase with a concentration of 10-20 U/g absolute dry pulp; 0.5-4% $Na_2SiO_3$, 0.1-0.8% $MgSO_4$, 0.1-0.8% EDTA, 0.1-4% $H_2O_2$ are used in the chemical treatment. The percentage is relative to the weight of absolute dry pulp.

In one embodiment of the present invention, the pulp preparation is carried out as follows: 100-200 g absolute dry pulp is adjusted to 10-20% pulp consistency and treated at 200-250 r/min for 20-30 minutes.

In one embodiment of the present invention, the enzymatic hydrolysis of the pulp is carried out at 40-60° C. for 100-200 minutes.

In one embodiment of the present invention, the chemical treatment is carried out at 50-70° C. for 30-120 minutes.

In one embodiment of the present invention, the pulp washing and dewatering is carried out by diluting waste pulp using deionized water.

In one embodiment of the present invention, the flotation is performed by adjusting pulp consistency to 1-2% by adding water and then floating at 40-50° C. for 60-120 minutes.

In one embodiment of the present invention, the method further comprises sheet making at 60 g/m².

In one embodiment of the present invention, the cutinase is from *Thermobifida fusca*, or an active cutinase, the amino acid sequence of which shares at least 60%, 65%, 70%, 75%, 80%, 85%, 90%, 92%, 95%, 97%, or at least 99% homology with that of the cutinase from *Thermobifida fusca*.

In one embodiment of the present invention, the cutinase is from *Fusarium solani*, or an active cutinase, the amino acid sequence of which shares at least 60%, 65%, 70%, 75%, 80%, 85%, 90%, 92%, 95%, 97%, or at least 99% homology with that of the cutinase from *Fusarium solani*.

In one embodiment of the present invention, the cutinase has an NCBI GenBank accession number of AAZ54920, AAZ54921 or AAA33334.

In one embodiment of the present invention, the cutinase is produced by the recombinant *E. coli* (Chen S, Tong X, Woodard R W, Du G C, Wu J, Chen J, Identification and Characterization of Bacterial Cutinase, The Journal of Biological Chemistry, 2008, 283(28) 25854-25862). The recombinant *E. coli* is cultured under a standard culture condition and centrifuged at 12000 r/min for 10 minutes. The cutinase is obtained from the supernatant.

In one embodiment of the present invention, the cutinase can also be produced by the recombinant *Pichia pastoris*. The recombinant *Pichia pastoris* is incubated under a standard culture condition and centrifuged at 12000 r/min for 10 minutes, and the cutinase is obtained from the supernatant.

In one embodiment of the present invention, the method comprises the following steps:

(a) Pulp Preparation 100-200 g absolute dry pulp is adjusted to 10-20% pulp consistency and the pH is adjusted to 7.5~10.0 by NaOH or HCl, and then is treated at 200-250 r/min for 20-30 minutes.

(b) Enzymatic Hydrolysis

Enzymatic hydrolysis is carried out in a water bath at 40-60° C. for 100-200 minutes.

(c) Chemical Treatment

The chemical treatment is performed in a water bath at 50-70° C. for 30-120 minutes with 0.5-4% $Na_2SiO_3$, 0.1-0.8% $MgSO_4$, 0.1-0.8% EDTA and 0.1-4% $H_2O_2$.

(d) Pulp Washing and Dewatering

The enzymatically treated pulp is diluted using 4~6 liter deionized water, washed and shredded into small pieces, and air dried at room temperature.

(e) Flotation Treatment

The treated pulp is adjusted to 1% pulp consistency and floated at 45° C. for 60 minutes in a flotation cell, and then the floated pulp is filtered to remove the water and air-dried at room temperature.

(f) Physical Properties Analysis of Waste Pulp

The floated pulp is sheeted to 60 g/m² by a standard sheet machine. The whiteness, tear strength, tensile strength and bursting strength are measured.

The present invention enhances the deinking efficiency by combining enzymatic and chemical treatment. Compared to the existing methods, the method of the present invention significantly increases deinking efficiency and improves product quality while consuming less enzyme and chemical reagents. It also reduces the energy consumption per unit product and saves the cost of the sewage treatment. In addition, utilizing and recycling of waste paper has the advantages of saving primary fiber resources, reducing environmental pollution, simplifying the treatment process and reducing energy consumption. Wastepaper deinking using cutinase and chemical reagents can improve the wastepaper reuse and increase the usage proportion of the secondary fiber in papermaking raw materials. These benefits are especially important in today's society when the environmental protection has become increasingly important.

EXAMPLES

Materials and Methods:

Cutinase activity is determined by a continuous spectrophotometric assay using p-nitrophenyl butyrate (pNPB) as the substrate. The standard assay contains a final volume of 1.5 ml with 1470 μL buffer (Tris-HCl containing 50 mmol/L sodium taurodeoxycholate and 50 mmol/L pNPB, pH 8.0 ) and 30 μL enzyme solution. The formation of p-nitrophenol is spectrophotometrically monitored at 405 nm. One unit of enzyme activity is defined as production of 1 mol p-nitrophenol from hydrolysis of 1 mol pNPB per minute at 37° C.

Example 1

Wastepaper Deinking Using Cutinase or Chemical Treatment Deinking by Cutinase Derived from *Thermobifida Fusca*

(1) Pulp Preparation 200 g absolute dry pulp was adjusted to 10% pulp consistency, and then treated at 225 r/min for 30 minutes.

(2) Enzymatic Hydrolysis

Enzymatic hydrolysis was carried out in a water bath at 60° C. for 120 minutes during which the pulp was kneaded every 10 minutes.

(3) Pulp Washing and Dewatering

The treated pulp was diluted by 5 liter deionized water, subsequently washed and shredded into small pieces, and then air dried at room temperature.

(4) Flotation Treatment

The obtained pulp was adjusted to 1% pulp consistency by heated water and floated at 45° C. for 60 minutes, and then the floated pulp was filtered to remove the water and air-dried at room temperature.

(5) Physical Properties Analysis of Waste Pulp

The floated pulp was sheeted to 60 g/m² by a standard sheet machine. The whiteness, tear strength, tensile strength and bursting strength were measured.

Deinking by Cutinase Derived from *Fusarium Solani*

(1) Pulp Preparation 200 g absolute dry pulp was adjusted to 10% pulp consistency and then been treated at 225 r/min for 30 minutes.

(2) Enzymatic Hydrolysis

Enzymatic hydrolysis was carried out in a water bath at 30° C. for 120 minutes during which the pulp was kneaded every 10 minutes.

(3) Pulp Washing and Dewatering

The enzymatically treated pulp was diluted using 5 liter deionized water, subsequently washed and shredded into small pieces, and then air dried at room temperature.

(4) Flotation Treatment

The treated pulp was adjusted to 1% pulp consistency by adding heated water and floated at 45° C. for 60 minutes, and then the floated pulp was filtered to remove the water and air-dried at room temperature.

(5) Physical Properties Analysis of Waste Pulp

The floated pulp was sheeted to 60 g/m² by a standard sheet machine. The whiteness, tear strength, tensile strength and bursting strength were measured.

Chemical Deinking (1) Pulp Preparation 200 g absolute dry pulp was adjusted to 10% pulp consistency, and then been treated at 225 r/min for 20 minutes.

(2) Flotation Treatment

The treated pulp was adjusted to 1% pulp consistency by adding a heated solution containing 2% $Na_2SiO_3$, 0.4% $MgSO_4$, 0.4% EDTA, 2% $H_2O_2$, 4% NaOH and floated at 45° C. for 60 minutes, and then the floated pulp was filtered to remove the water and air-dried at room temperature.

(3) Physical Properties Analysis of Waste Pulp

The floated pulp was sheeted to 60 g/m² by a standard sheet machine. The whiteness, tear strength, tensile strength and bursting strength were measured.

TABLE 1

Effect of the enzymatic or chemical deinking process on whiteness of recycled paper

| Enzyme amount (U/g absolute dry pulp) | Chemical deinking (1) | Cutinase from *Thermobifida fusca* (2) | Increase in Whiteness from Method (1) to (2) | Cutinase from *Fusarium solani* (3) | Increase in Whiteness from Method (1) to (3) |
|---|---|---|---|---|---|
| 40 | 45.28[a] | 47.03 | 1.75 | 46.88 | 1.6 |
| 20 | 40.97[b] | 42.64 | 1.67 | 42.45 | 1.48 |

Note:
chemical deinking comprises procedures of pulp preparation, flotation treatment and physical properties analysis without enzyme addition;
[a]the wastepaper was floated in 2% $Na_2SiO_3$, 0.4% $MgSO_4$, 0.4% EDTA, 2% $H_2O_2$ and 4% NaOH at 45° C. for 60 minutes;
[b]the wastepaper was floated in 1% $Na_2SiO_3$, 0.2% $MgSO_4$, 0.2% EDTA, 1% $H_2O_2$ and 2% NaOH at 50° C. for 60 minutes.

TABLE 2

Effect of the enzymatic or chemical deinking process on physical properties of recycled paper

| Method | | Tear strength | Tensile strength | Bursting strength |
|---|---|---|---|---|
| Cutinase from | 40 U/g | 4.8 | 21.5 | 1.09 |
| *Thermobifida fusca* | 20 U/g | 4.6 | 21.8 | 0.98 |
| Cutinase from | 40 U/g | 4.6 | 21.3 | 1.01 |
| *Fusarium solani* | 20 U/g | 4.5 | 21.4 | 0.99 |
| Chemical deinking[a] | | 4.5 | 20.9 | 0.97 |

Note:
[a]the wastepaper was floated in 2% $Na_2SiO_3$, 0.4% $MgSO_4$, 0.4% EDTA, 2% $H_2O_2$ and 4% NaOH at 45° C. for 60 minutes without enzymatic hydrolysis.

Example 2

Wastepaper Deinking Using Cutinase from *Thermobifida Fusca* Combined with Chemical Treatment Deinking by Cutinase (1) Pulp Preparation 200 g absolute dry pulp was adjusted to 10 % pulp consistency, and then been treated at 225 r/min for 20 minutes.

(2) Enzymatic Hydrolysis

Enzymatic hydrolysis was carried out in a water bath at 50° C. for 120 minutes during which the pulp was kneaded every 10 minutes.

(3) Chemical Treatment

Chemical treatment was carried out in a water bath at 50° C. for 60 minutes with 1% $Na_2SiO_3$, 0.2% $MgSO_4$, 0.2% EDTA, and 1% $H_2O_2$.

(4) Pulp Washing and Dewatering

The treated pulp was diluted using 5 liter deionized water, subsequently washed and shredded into small pieces, and then air dried at room temperature.

(5) Flotation Treatment

The treated pulp was adjusted to 1% pulp consistency by adding heated water and floated at 45° C. for 60 minutes, and then the floated pulp was filtered to remove the water and air-dried at room temperature.

(6) Physical Properties Analysis of Waste Pulp

The floated pulp was sheeted to 60 g/m² by a standard sheet machine. The whiteness, tear strength, tensile strength and bursting strength were measured.

TABLE 3

Comparison of the whiteness of recycled wastepaper obtained by the combined method or enzyme only method using cutinase from *Thermobifida fusca*

| Enzyme amount (U/g absolute dry pulp) | Whiteness obtained by enzymatic and chemical treatment (2) | Whiteness obtained by enzymatic treatment only (1) | Increase in Whiteness from Method (1) to (2) |
|---|---|---|---|
| 20 | 48.23 | 42.64 | 5.59 |
| 10 | 44.36 | 41.02 | 3.34 |

TABLE 4

Comparison of the physical properties of recycled wastepaper obtained by the combined method or enzyme only method using cutinase from *Thermobifida fusca*

| Method | | Tear strength | Tensile strength | Bursting strength |
|---|---|---|---|---|
| Enzymatic and | 20 U/g | 5.2 | 21.9 | 1.13 |
| chemical deinking | 10 U/g | 4.9 | 21.8 | 1.12 |
| Cutinase from | 40 U/g | 4.8 | 21.5 | 1.09 |
| *Thermobifida fusca* | 20 U/g | 4.6 | 21.8 | 0.98 |
| Chemical deinking[a] | | 4.5 | 20.9 | 0.97 |

Note:
[a]the wastepaper was floated in 2% $Na_2SiO_3$, 0.4% $MgSO_4$, 0.4% EDTA, 2% $H_2O_2$ and 4% NaOH at 45° C. for 60 minutes without enzymatic hydrolysis.

Example 3

Wastepaper Deinking Using Cutinase from Fusarium Solani Combined with Chemical Treatment Deinking by Cutinase (1) Pulp Preparation 200 g absolute dry pulp was adjusted to 10% pulp consistency, and then treated at 225 r/min for 20 minutes.

(2) Enzymatic Hydrolysis

Enzymatic hydrolysis was carried out in a water bath at 50° C. for 120 minutes during which the pulp was kneaded every 10 minutes.

(3) Chemical Treatment

Chemical treatment was carried out in a water bath at 50° C. for 60 minutes with 2% $Na_2SiO_3$, 0.1% $MgSO_4$, 0.1% EDTA, and 2% $H_2O_2$.

(4) Pulp Washing and Dewatering

The treated pulp was diluted by 5 liter deionized water, then washed and shredded into small pieces and air dried at room temperature.

(5) Flotation Treatment

The treated pulp was adjusted to 1% pulp consistency by adding heated water and floated at 45° C. for 60 minutes, and then the floated pulp was filtered to remove the water and air-dried at room temperature.

(6) Physical Properties Analysis of Waste Pulp

After flotation, the pulp was sheeted to 60 g/m$^2$ by a standard sheet machine. The whiteness, tear strength, tensile strength and bursting strength were measured.

TABLE 5

Comparison of the whiteness of recycled wastepaper obtained by the combined method or enzyme only method using cutinase from *Fusarium solani*

| Enzyme amount (U/g absolute dry pulp) | Whiteness obtained by enzymatic and chemical treatment (2) | Whiteness obtained by enzymatic treatment only (1) | Increase in Whiteness from Method (1) to (2) |
|---|---|---|---|
| 20 | 48.13 | 42.45 | 5.68 |
| 10 | 43.97 | 40.99 | 2.98 |

TABLE 6

Comparison of the physical properties of recycled wastepaper obtained by the combined method or enzyme only method using cutinase from *Fusarium solani*

| Method | | Tear strength | Tensile strength | Bursting strength |
|---|---|---|---|---|
| Enzymatic and chemical deinking | 20 u/g | 4.9 | 21.6 | 1.04 |
| | 10 u/g | 4.8 | 21.5 | 1.02 |
| Cutinase from *Fusarium solani* | 40 u/g | 4.6 | 21.3 | 1.01 |
| | 20 u/g | 4.5 | 21.4 | 0.99 |
| Chemical deinking$^a$ | | 4.5 | 4.5 | 20.9 |

Note:
$^a$the wastepaper was floated in 2% Na$_2$SiO$_3$, 0.4% MgSO$_4$, 0.4% EDTA, 2% H$_2$O$_2$ and 4% NaOH at 45° C. for 60 minutes without enzymatic hydrolysis.

* * *

While the present invention has been described in some detail for purposes of clarity and understanding, one skilled in the art will appreciate that various changes in form and detail can be made without departing from the true scope of the invention. All figures, tables, appendices, patents, patent applications and publications, referred to above, are hereby incorporated by reference.

What is claimed is:

1. A method for wastepaper deinking by combined use of cutinase and chemical reagents, comprising: pulp preparation, enzymatic hydrolysis, chemical treatment, pulp washing and dewatering, and flotation, wherein the enzyme used for the enzymatic hydrolysis is cutinase with a concentration of 10-20 U/g absolute dry pulp, and the solution used in the chemical treatment contains 0.5-4% Na$_2$SiO$_3$, 0.1-0.8% MgSO$_4$, 0.1-0.8% EDTA, and 0.1-4% H$_2$O$_2$.

2. The method of claim 1, wherein the enzymatic hydrolysis is carried out at 40-60° C. for 100-200 minutes.

3. The method of claim 1, wherein the chemical treatment is carried out at 50-70° C. for 30-120 minutes.

4. The method of claim 1, wherein the cutinase is from *Thermobifida fusca* or *Fusarium solani*.

5. The method of claim 1, wherein the cutinase is a cutinase having an NCBI GenBank accession number of AAZ54920, AAZ54921 or AAA33334, or an active cutinase having an amino acid sequence with at least 90% homology to that of the cutinase with an NCBI GenBank accession number of AAZ54920, AAZ54921 or AAA33334.

6. The method of claim 1, wherein the pulp preparation is performed by adjusting 100-200 g absolute dry pulp to 10-20% pulp consistency, and keeps pulping at 200-250 r/min for 20-30 minutes.

7. The method of claim 1, wherein the pulp washing and dewatering is carried out by diluting waste pulp using deionized water.

8. The method of claim 1 further comprises using a sheet machine to make a sheet of 60 g/m$^2$ from the pulp.

* * * * *